United States Patent
Abukwaik et al.

(10) Patent No.: US 11,774,941 B2
(45) Date of Patent: Oct. 3, 2023

(54) METHOD FOR PROVIDING A LIST OF EQUIPMENT ELEMENTS IN INDUSTRIAL PLANTS

(71) Applicant: ABB Schweiz AG, Baden (CH)

(72) Inventors: Hadil Abukwaik, Weinheim (DE); Jens Doppelhamer, Ladenburg (DE); Marcel Dix, Mannheim (DE); Benjamin Kloepper, Mannheim (DE); Pablo Rodriguez, Ilvesheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/725,490

(22) Filed: Apr. 20, 2022

(65) Prior Publication Data

US 2022/0342382 A1    Oct. 27, 2022

(30) Foreign Application Priority Data

Apr. 22, 2021 (EP) ..................... 21169992

(51) Int. Cl.
*G05B 19/4065* (2006.01)

(52) U.S. Cl.
CPC ............ *G05B 19/4065* (2013.01); *G05B 2219/31057* (2013.01)

(58) Field of Classification Search
None
See application file for complete search history.

(56) References Cited

U.S. PATENT DOCUMENTS

| | | |
|---|---|---|
| 2009/0204245 A1 | 8/2009 | Sustaeta et al. |
| 2020/0134369 A1 | 4/2020 | Chopra et al. |
| 2022/0171891 A1* | 6/2022 | Sinha ............... G06N 5/022 |

FOREIGN PATENT DOCUMENTS

WO    WO 2020/082865 A1    4/2020

OTHER PUBLICATIONS

European Patent Office, Extended European Search Report in European Patent Application No. 21169992.1, 8 pp. (dated Oct. 4, 2021).

Wikipedia, "Directed acyclic graph," webpage downloaded from the Internet on Apr. 18, 2022, at https://en.wikipedia.org/w/index.php?title=Directed_acyclic_graph&oldid=1016015714, 13 pp. (Apr. 4, 2021).

* cited by examiner

*Primary Examiner* — Ryan A Jarrett
(74) *Attorney, Agent, or Firm* — Leydig, Voit & Mayer, Ltd.

(57) ABSTRACT

A system and method provides an impact list of affecting equipment elements that affect an industrial sub-process. The method comprises the steps of selecting, in a topology model, the sub-process, wherein the sub-process is an equipment element that is a part of an industrial plant or process, and wherein the topology model is a graph, whose nodes represent equipment elements and whose edges represent interconnections between the equipment elements; traversing the nodes of the topology model, wherein the traversing starts from the selected sub-process and uses a traversing strategy; and for each of the at least one equipment elements, if the equipment element affects the industrial sub-process by an affecting degree greater than a first predefined affecting degree, adding the equipment element to the impact list of affecting equipment elements.

13 Claims, 3 Drawing Sheets

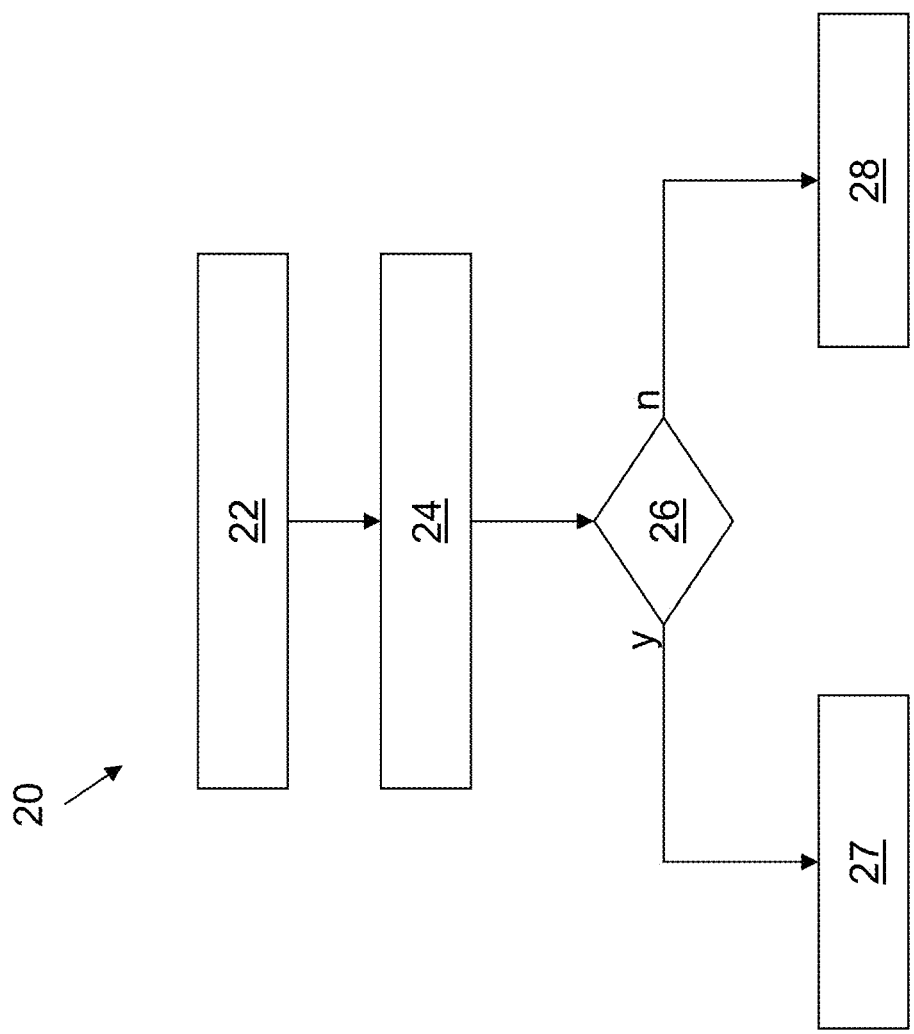

METHOD FOR PROVIDING A LIST OF EQUIPMENT ELEMENTS IN INDUSTRIAL PLANTS

CROSS-REFERENCE TO RELATED APPLICATIONS

Figure 1:
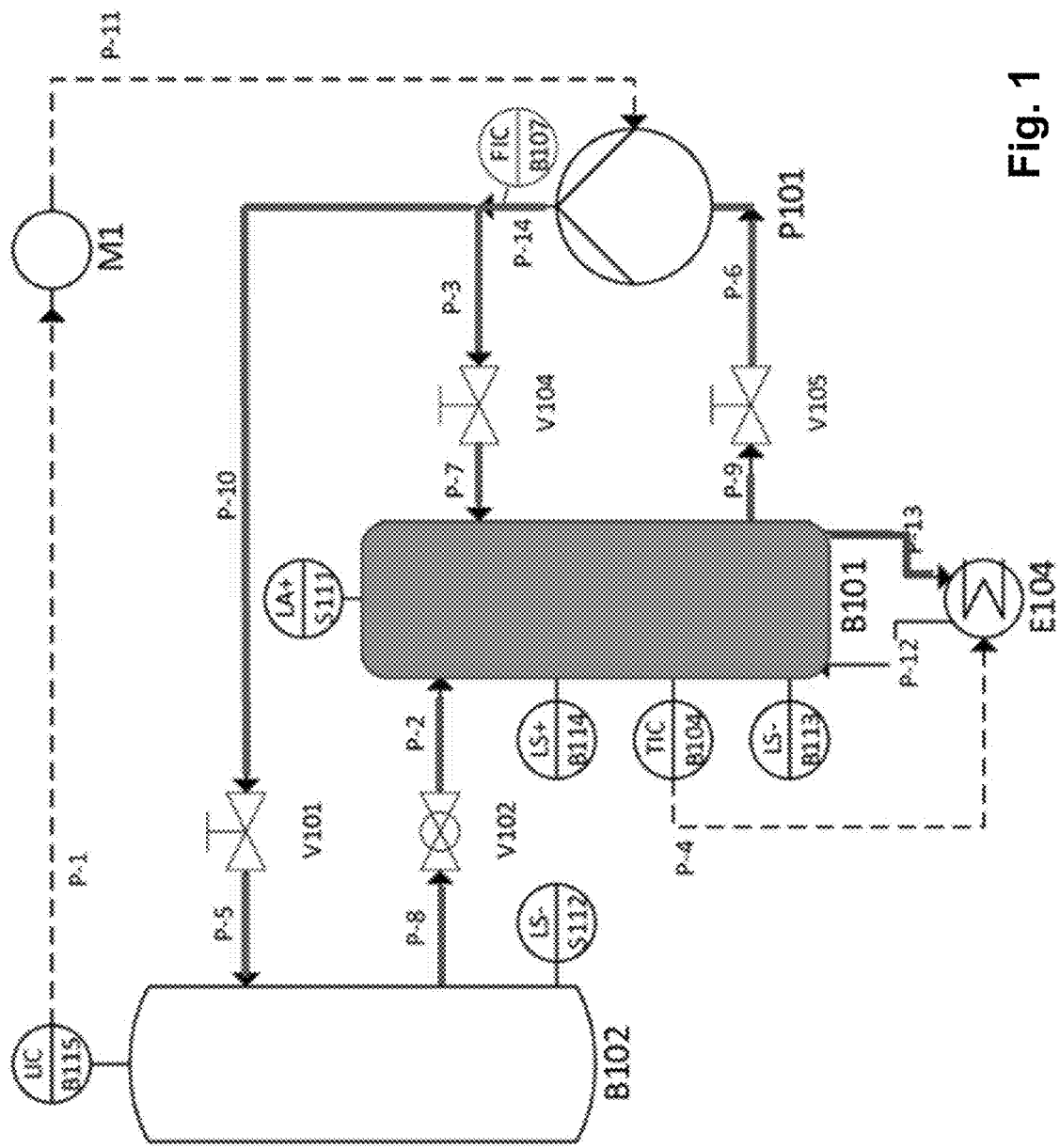

This patent application claims priority to European Patent Application No. 21169992.1, filed on Apr. 22, 2021, which is incorporated herein in its entirety by reference.

FIELD OF THE DISCLOSURE

The present disclosure relates to the field of industrial plants and processes and, more particularly, to a method for maintaining and/or improving the industrial plants and processes.

BACKGROUND OF THE INVENTION

Industrial plants and processes are not only complex networks of elements connected by flow of material, energy and/or information, but they often have domain process rules that define the elements' logical interdependencies and/or how they influence each other's state, in some cases even for very distant ones. For maintaining and/or for improving the plants and processes, an insight into functional dependencies of selected equipment elements may be helpful.

BRIEF SUMMARY OF THE INVENTION

The present disclosure describes a method for maintaining and/or for improving the plants and processes and/or their equipment elements. This objective is achieved by the subject-matter of the independent claims. Further embodiments are evident from the dependent claims and the following description.

One aspect relates to a method for providing an impact list of affecting equipment elements that affect an industrial sub-process, wherein affecting the industrial sub-process may (or may not) comprise to control or influence otherwise the sub-process' flow of material, of energy, of information, and/or of other aspects. In one embodiment, the method comprises the steps of:

Selecting, in a topology model, the sub-process, wherein the sub-process is an equipment element that is a part of an industrial plant or process, and wherein the topology model is a graph, whose nodes represent equipment elements and whose edges represent interconnections between the equipment elements;

Traversing the nodes, which represent equipment elements, of the topology model, wherein the traversing starts from the selected sub-process and uses a traversing strategy; and For each of the at least one equipment elements, if the equipment element affects the industrial sub-process by an affecting degree greater than a first predefined affecting degree, adding the equipment element to the impact list of affecting equipment elements.

BRIEF DESCRIPTION OF THE SEVERAL VIEWS OF THE DRAWING(S)

FIG. 1 schematically represents an exemplary topology model of a section of a plant in accordance with the disclosure.

Figure 2:
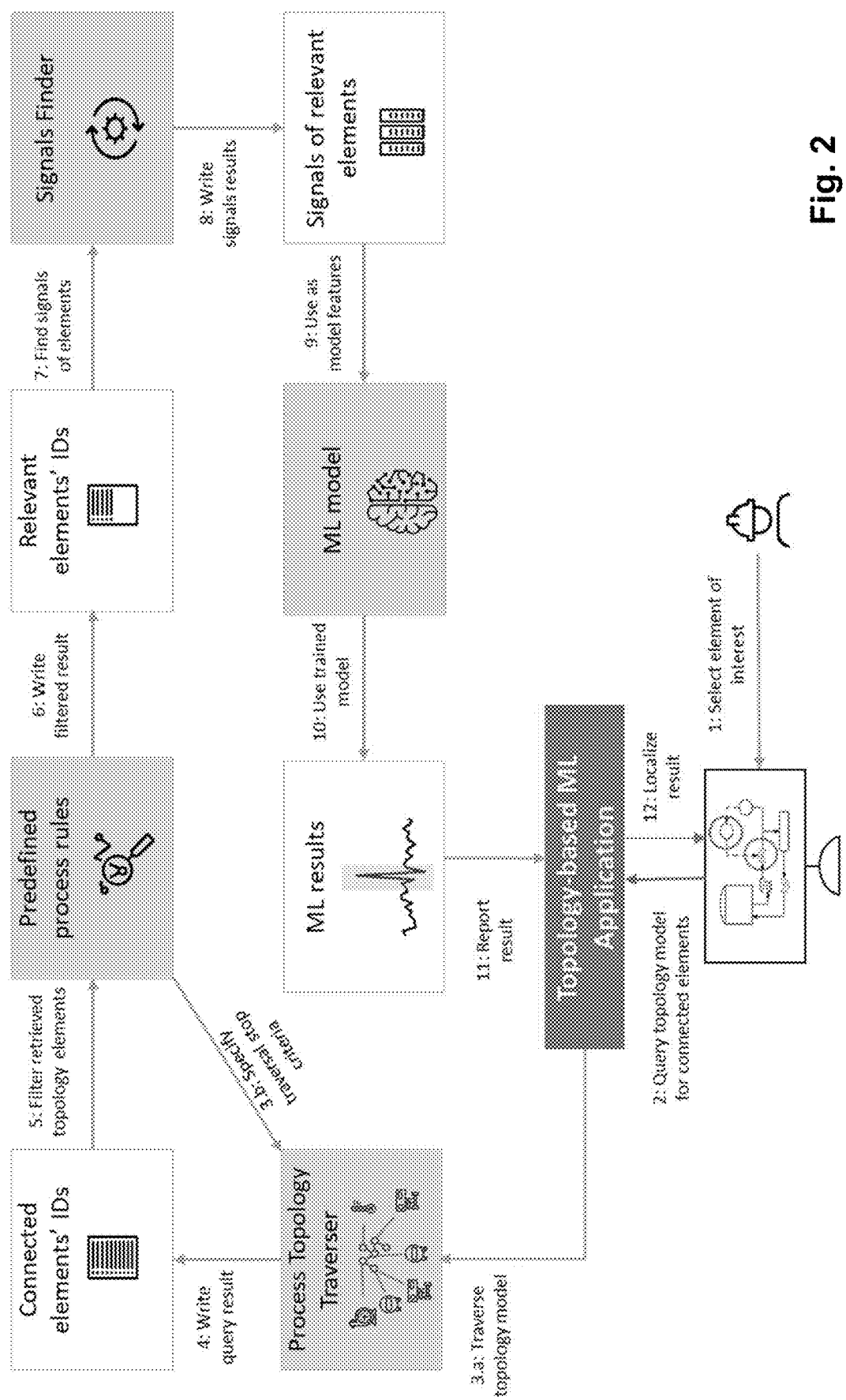

FIG. 2 schematically represents an exemplary model of cooperating representation of a plant in accordance with the disclosure.

FIG. 3 is a flow diagram for a method according to an embodiment of the present disclosure.

DETAILED DESCRIPTION OF THE INVENTION

FIG. 1 schematically shows a (small) exemplary topology model of a section of an industrial plant and process. In the topology model shown, a vessel B1010 is selected as a sub-process of interest. The traversing is limited to a number of N=2 hops. The related edges are marked by broad lines. The selecting is limited to two properties of the sub-process, namely by a material (fluid) flow and by a temperature. Hence, an impact list comprises valve V105, pump P101, valve V104, valve V101, Vessel B102, valve V102 for the material flow, and heat exchanger E104 for the temperature. For each equipment, a number of measurements collecting their status may be performed. For example, the vessel B102 may have level sensors B113 and B114 that deliver a signal to the control system related to "material flow". Accordingly, the impact list of equipment elements comprises the related "material flow" elements. These may be as inputs for building a ML model related "material flow".

FIG. 2 schematically shows an exemplary model of cooperating representation of an industrial plant and process. For example, a person (e.g. a data scientist) may demand to get an impact list of affecting equipment elements that affect an industrial sub-process. So, the person may (step 1) use a topology model for selecting the sub-process of interest and (step 2) to send a query related to this. This query may initiate (step 3) to traverse the topology model, wherein the traversing starts from the sub-process of interest, and uses a traversing strategy, e.g. a breadth-first search, through the topology model. As an intermediate step (step 4), all elements of this breadth-first search are shown; this may include the elements' IDs. Furthermore, rules may be used to define the affecting degree (step 5). Then (step 6), the selecting may be limited to one or more properties or attributes of the sub-process. This (step 7) may comprise to identify sensors and/or signals related to the properties or attributes. These results (step 8) may be collected and (step 9) output as the impact list and/or impact graph. After training an ML model based on the impact list (step 10), the result is reported (step 11) and shown (step 12) as localized in the topology model. Note that not in every embodiment all the steps described in FIG. 2 may be performed. Furthermore, some steps described may be done only to display the method's proceeding to a person, e.g. to enable person-driven decisions and/or to increase the trust in the method.

Hence, in one aspect, the embodiment shown in FIG. 2 summarizes a process that is initiated by a data scientist demand to get the set of relevant features for a selected element from the topology model in which he has interest to train and build a ML model. As a possible further step, the data scientist may be supported with an explanation of the ML results, e.g. based on the specified logical rules and physical interconnections. Besides, the mapping of topology elements to control system signals may be done based on the control system module type used to implement the element, i.e. depending on the specific module type that is used to implement a certain element (e.g. a PID loop), a configured subset of signals may be chosen. Also, the system may maintain a database of known signal selection configurations for a set of control module type libraries and may allow the user of the system to add to that database when unknown control module types are encountered.

FIG. 3 shows a flow diagram 20 according to an embodiment. In a step 22, a sub-process of an industrial plant or process is selected in a topology model. The sub-process may be an equipment element that is a part of an industrial plant or process, and the topology model may be a graph, whose nodes represent equipment elements and whose edges represent interconnections between the equipment elements. In a step 24, the topology model is traversed, wherein the traversing starts from the selected sub-process and uses a traversing strategy. In a step 26, for each equipment element an affecting degree is checked, i.e. a quantitative measure how the equipment element affects the industrial sub-process. If the equipment element affects the industrial sub-process by an affecting degree greater than a first predefined affecting degree, in a step 27 the equipment element is added to an impact list of affecting equipment elements. If not, no action may be taken (step 28). The impact list is a list of affecting equipment elements that affect the industrial sub-process of interest. The impact list may comprise properties, attributes, signals, and/or further entities of each of the equipment elements. The impact list may be used as an input for training machine learning programs.

In one general aspect, the present disclosure describes a method for maintaining and/or for improving the plants and processes and/or their equipment elements. This objective is achieved by the subject-matter of the independent claims. Further embodiments are evident from the dependent claims and the following description.

One aspect relates to a method for providing an impact list of affecting equipment elements that affect an industrial sub-process, wherein affecting the industrial sub-process may (or may not) comprise to control or influence otherwise the sub-process' flow of material, of energy, of information, and/or of other aspects. The method comprises the steps of:

Selecting, in a topology model, the sub-process, wherein the sub-process is an equipment element that is a part of an industrial plant or process, and wherein the topology model is a graph, whose nodes represent equipment elements and whose edges represent interconnections between the equipment elements;

Traversing the nodes, which represent equipment elements, of the topology model, wherein the traversing starts from the selected sub-process and uses a traversing strategy; and For each of the at least one equipment elements, if the equipment element affects the industrial sub-process by an affecting degree greater than a first predefined affecting degree, adding the equipment element to the impact list of affecting equipment elements.

The method may, for instance, be used for a fast fixing of errors of the industrial sub-process, e.g. recognizing faulty behaviour in the industrial sub-process and/or in elements the industrial sub-process comprises. An impact list is a list of equipment elements that affect an industrial sub-process. The impact list may consist of 0, 1, n elements. The impact list may be used, for example, by service personnel, for trainings, for constructive changes of the the plant or process considered, and/or may be used by further equipment and/or programs, e.g. by programs that perform machine learning (ML). To affect an industrial sub-process may comprise to control or influence otherwise the sub-process' flow of material, of energy, of information, and/or of other aspects. The affecting is not necessarily directed into the direction of the flow etc. For instance, a vessel may be affected by a first valve that fills the vessel, and by a second valve that empties the vessel; both valves affect the vessel, although their flows lead into different directions. The sub-process is an equipment element (or more equipment elements) that is a part of an industrial plant or process. A simple example of a sub-process may be a vessel, a valve, or a controlling element of the valve, and/or a composed entity, e.g. the valve plus its controlling element, or even a bigger composite of equipment elements. In at least some cases, it may, from a logical point of view, make no difference if the industrial sub-process "looks" like one or more elements. For instance, an electric motor that includes its control elements in one housing may be considered as one element, i.e. "one electric motor", or as a composite of elements, i.e. an "electric motor with a control loop that comprises several control elements, and also a backup energy supply."

The topology model may be a bidirectional graph. The elements of topology model may represent physical entities, for example components in a plant, like, e.g., vessels, pipes, sensors, actuators and/or connections, which may represent a flow of material, of energy, of information, and/or of other aspects in the plant. Consequently, results from evaluating the topology model may contribute for fixing errors and/or otherwise optimizing the plant or parts of it. The graph may be represented in a graphical way, in form of a matrix, an XML (Extensible Markup Language) list, and/or by other means. For instance, the topology model may be a piping and instrumentation diagram (P&ID), e.g. in a topology editor, and/or a process graphic tool. The topology model could, e.g., be generated by automated means from one or several P&IDs, e.g. by using transformation tools or by being formatted as a smart standardized P&ID. The equipment elements, as represented by the topology model, may be interconnected, e.g. by mechanical means, by a material and/or energy flow, and/or by logical causal relations, i.e. they may, as an example, affect a state of each other. Thus, the nodes of the topology model may represent equipment elements—including the sub-process—and the edges of the topology model may represent interconnections between the equipment elements. The topology model—and the control system configuration represented by it—may have been created using different tools with a different format. At least some topology models may be challenging when displayed in a graphical way, particularly in cases of large plants where connected elements may be very distant and may expand over multiple pages on a graphical tool. When considering the topology model, it may be hard to decide if one sub-process or equipment element is affected or not affected by another equipment element.

Depending on its representation, selecting the sub-process of interest in the topology model may comprise a "clicking" on a graphical element, or marking it otherwise, e.g. by selecting an XML-entry representing the sub-process or aspects (e.g. a property or attribute) of it.

The traversing starts from the selected sub-process and uses a traversing strategy, e.g. going lexically through all the elements, using a breadth-first search, a depth-first search, a mix of them and/or further strategies, such as a heuristic or a rule-based approach. This may comprise deciding a direction of analysis for influential features (i.e., forward, backward, bi-directional) to find influential elements and signals. Further strategies (sometimes called "causality analysis strategies") may be based on statistical methods, e.g., correlations, transfer entropy, or machine learning, e.g., pattern recognition and causality inference algorithms.

For each of the at least one equipment elements is checked, if the equipment element affects the industrial sub-process by an affecting degree greater than a first predefined affecting degree. The affecting degree could be a quantitative value, such as a maximum value—for example a maximum value of a flow through a valve, or a maximum heating capacity of a heater—or a range of values or a "fuzzy" value. The affecting degree may consider if the process is run in a "normal mode", in an "emergency mode", or in another mode. For instance, a safety valve may not be considered for some kind of impact lists that describe a "normal mode", but for another kind of impact lists that describe an "emergency mode". In cases when the affecting degree is greater than a first predefined affecting degree, the equipment element is added to the impact list of affecting equipment elements. A first predefined affecting degree could, e.g., be zero or a small value, depending on the sub-process, or a quite high value, e.g. for emergency functions. In cases, when the traversing does not find any node or equipment element whose affecting degree is greater than the first predefined affecting degree, the resulting impact list is empty.

By this method, advantageously only such equipment elements are added to the impact list, which indeed, affect a sub-process, i.e. values of less relevance are neglected. This may help a lot both to get a quick insight in parts of an enormously big plant, and/or may contribute to a fast fixing of errors. The impact list may comprise unique identifiers for the plant/process instruments, where each of them may identify, in turn, a set of signals. Once the impact list is built from the topology model, their corresponding signals in the control builder may be sent to a data scientist, e.g. to evaluate a situation and/or to train a machine learning model. The method, further, may provide data scientists with a list of elements for training an ML model for a selected element. These may be based, as pointed out above, on its physical interconnections (as found in the "topology model" on the paths) and on logical relations (defined, e.g., as "domain process rules" among the elements) in the plant or production process. Using, e.g., said domain process rules, the traversal algorithm may also stop at defined (e.g. interconnection) properties or attributes of the elements and may, thus, include "only relevant (or highly relevant)" elements in the impact list. Furthermore, the method may search for signals in the control system associated with the topology elements' properties or attributes.

Hence, the impact list may leads to a better training for ML models, which are based on relevant equipment elements (or, in a topology model, topology elements) and/or their properties or attributes; accordingly, the ML's performance results may be enhanced.

In addition, the impact list may enhance an "explainability" of the topology model, which may result in better understanding of the plant's behaviour, and improved training, also by using process-related language the operator can understand. Furthermore, this enables capturing a process expert knowledge, e.g. as domain rules, once and reusing it in cross-plant analyses. The reusing may comprise "stop criteria" in the traversal of the topology model and/or "filter criteria" in collecting the elements on the traversal material and information flows. This may, further, comprise an approximate or linguistic quantification of influential relations among the process elements capturing the process expert knowledge and/or automated derivation of influential relation using historical or simulated data.

In various embodiments, the traversing strategy comprises a breadth-first search, a depth-first search, a mix of them and/or further strategies, such as a heuristic and/or a rule-based approach. Further strategies (sometimes called "causality analysis strategies") may be based on statistical methods, e.g., correlations, transfer entropy, or machine learning, e.g., pattern recognition and causality inference algorithms.

In various embodiments, the traversing is limited to a selectable number of hops. The "hops" are a kind of measures for a "distance" of a currently traversed equipment element to the sub-process of interest, e.g. the number of edges between the currently traversed equipment element to the sub-process of interest. For instance, if the traversing is limited to N=2 hops, the topology model only considers equipment elements with a maximum distance of 2 edges between the currently traversed equipment element to the sub-process of interest. This kind of "stop criterion" may be combined with one or more other "stop criteria". This advantageously provides an easy-to-apply stop criterion with fast run-times of the method.

In various embodiments, the traversing is stopped for each branch at an affecting equipment element that affects the industrial sub-process by an affecting degree less than a second predefined degree. Note that the affecting equipment element is already part of the impact list. This advantageously copes with a problem that highly complex plants may be affected by many equipment elements, but sometimes only to a negligible degree. This kind of "stop criterion" may be combined with one or more other "stop criteria."

In various embodiments, the selecting is limited to a selectable number of properties or attributes of the sub-process. The property or attribute may be, e.g. a temperature, an energy or material flow, material density, pressure in a vessel, pressure of an equipment, material level, flow speed and/or further attributes. As an example, a heater may affect the temperature of a vessel, but not its material flow. As a further example, a valve may affect the material flow of a vessel, but not its temperature. Limiting to only one property or attribute may reduce the complexity further. In addition, several impact lists, which consider different attributes, may be combined in a focused and intentional way.

In various embodiments, the affecting degree is quantized by a value, by a range of values, by a fuzzy value, lower-bound and/or upper-bound approximations, particularly using rough sets, and/or by further quantisation values. An example of a fuzzy value may be a set of values "high"; "medium"; "low" for a vessel temperature. At least some of the fuzzy values may be mapped to a range of values.

In various embodiments, the affecting degree is defined by a rule. An example of a rule may can be found in the below expression:

IF the inlet valve V of a separator S is opened AND every outlet valve is closed THEN the level Ls in the separator rises.

The rule may be created from historical data patterns, by a machine learning program, ML, and/or by an expert. Rules, e.g. from different sources, may be combined. It is also possible to enrich the rules with quantification for the relations using Fuzzy logic, in which a quantity can be expressed using linguistic values instead of precise numerical values. The rule specification may be specified using a domain specific language or could be tool-supported to allow visual specification directly on the topology model.

A way to automate the specification of rules may be to depend on deriving the rules from historical data patterns and to allow the expert(s) to review, accept, edit, and/or decline the rule(s). Additionally or as an alternative, automatically derived rules could be used and be combined with an expert feedback to enhance the quality of the automated derivation of rules.

In some embodiments, the affecting degree is defined by a correlation. Examples may comprise filtering techniques, for example filtering on statistical criteria, e.g. by a correlation of a property or attribute to a target variable.

In some embodiments, the affecting degree is defined by an ML wrapper method. Wrapper methods, e.g., solve an ML problem by using different sets of properties and search for the best set of properties.

In some embodiments, the affecting degree is defined by an ML embedded method, particularly by an regularization and/or a decision tree. In embedded methods, the ML algorithm itself identifies the relevant features. Examples may comprise decision tree learning algorithms like ID3 or regression methods like "Lasso."

In various embodiments, the method further comprising the step of: constructing an impact graph from the impact list, wherein the impact graph comprises a node that represents the affecting equipment element, and wherein the impact graph comprises a weighted edge that represents the degree, by which the affecting equipment element affects the industrial sub-process. The impact graph may advantageously ease the evaluation of functional inter-dependencies within a plant. It may, however, neglect further pieces of information of, e.g., a topology model, for instance a localization of the equipment elements, their sizes, their forms, etc. It is also possible to combine the impact graph and the topology model, e.g. by an "overlay", where the impact graph and the topology model are displayed on different levels and/or half-transparent.

An aspect relates to a computer program product comprising instructions, which, when the program is executed by a computer, cause the computer to carry out the method as described above and/or below.

An aspect relates to a computer-readable storage medium where a computer program or a computer program product as described above is stored on.

An aspect relates to a computer-based system configured for performing a method as described above and/or below.

An aspect relates to an industrial plant or a processing system, comprising a computer-based system as described above and/or below.

An aspect relates to a use of a method as described above and/or below for providing a list of affected equipment elements.

An aspect relates to a use of a list of affected equipment elements as described above and/or below, or of an impact graph as described above and/or below for training a Machine Learning program, ML. Once an impact list of affecting equipment elements that affect an industrial sub-process is available, their corresponding properties or attributes in the control builder may be sent to a data scientist and/or to train a machine learning model. This may, further, result in solving an ML optimization problem comprising "at which level to stop the traversing, i.e. when are the selected features good enough for training the ML model". This optimization may be done in an automated way, e.g. in the sense of automated machine learning (AutoML). In other words, the method may find the optimal set of features in an automated way by finding the optimal "traversing level" or "stop criterion", e.g. applicable for industrial plant topology maps. This may provide a approach how, e.g., AutoML could be realized in the industrial domain, e.g. for automated selection of attributes of interest. The attributes selection could, e.g., be based on a wrapper approach, where the list of attributes may be extended from a small number of attributes (based, e.g., on a proximity measure in the topology) towards larger features, thus finding a good compromise between complexity, runt-time and accuracy of the elements, which are to be considered, in a targeted way. Within each extension step, different subset of the current candidate features can be tested. AutoML may further optimize hyperparameters of the ML's training process.

For further clarification, the invention is described by means of embodiments shown in the figures. These embodiments are to be considered as examples only, but not as limiting.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing an impact list of affecting equipment elements that affect an industrial sub-process, wherein affecting the industrial sub-process comprises to control or influence otherwise the sub-process' flow of material, of energy, of information, and/or of other aspects, the method comprising the steps of:

selecting using a controller, in a topology model, the sub-process, wherein the sub-process is an equipment element that is a part of an industrial plant or process, and wherein the topology model is a graph generated by the controller, whose nodes represent equipment elements and whose edges represent interconnections between the equipment elements;

traversing the nodes of the topology model using the controller, wherein the traversing starts from the selected sub-process and uses a traversing strategy; and for each of the at least one equipment elements, if the equipment element affects the industrial sub-process by an affecting degree greater than a first predefined affecting degree, adding the equipment element to the impact list of affecting equipment elements.

2. The method of claim 1, wherein the traversing strategy comprises a breadth-first search, a depth-first search, a mix of them, a heuristic, a rule-based approach, and/or statistical methods.

3. The method of claim 1, wherein the traversing is limited to a selectable number of hops.

4. The method of claim 1, wherein the traversing is stopped for each branch at an affecting equipment element that affects the industrial sub-process by an affecting degree less than a second predefined degree.

5. The method of claim 1, wherein the selecting is limited to a selectable number of properties of the sub-process.

6. The method of claim 1, wherein the affecting degree is quantized by a value, by a range of values, by a fuzzy value, lower-bound and/or upper-bound approximations, particularly using rough sets, and/or by further quantization values.

7. The method of claim 1, wherein the affecting degree is defined by a rule.

8. The method of claim 7, wherein the rule is created from historical data patterns, by a machine learning program, ML, and/or by an expert.

9. The method of claim 1, wherein the affecting degree is defined by a correlation.

10. The method of claim 1, wherein the affecting degree is defined by an ML wrapper method.

11. The method of claim 1, wherein the affecting degree is defined by an ML embedded method, particularly by an regularization and/or a decision tree.

12. The method of claim 1, further comprising the step of constructing an impact graph from the impact list, wherein the impact graph comprises a node that represents the affecting equipment element, and wherein the impact graph comprises a weighted edge that represents the degree, by which the affecting equipment element affects the industrial sub-process.

13. A non-transitory computer-readable storage medium comprising instructions, which, when executed by a computer, cause the computer to carry out the method according to claim 1.

* * * * *